May 5, 1953     T. J. SULLIVAN     2,637,331
SAFETY CUTOFF VALVE
Filed April 23, 1952
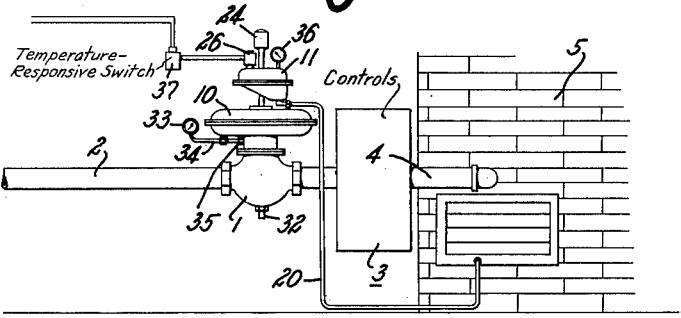
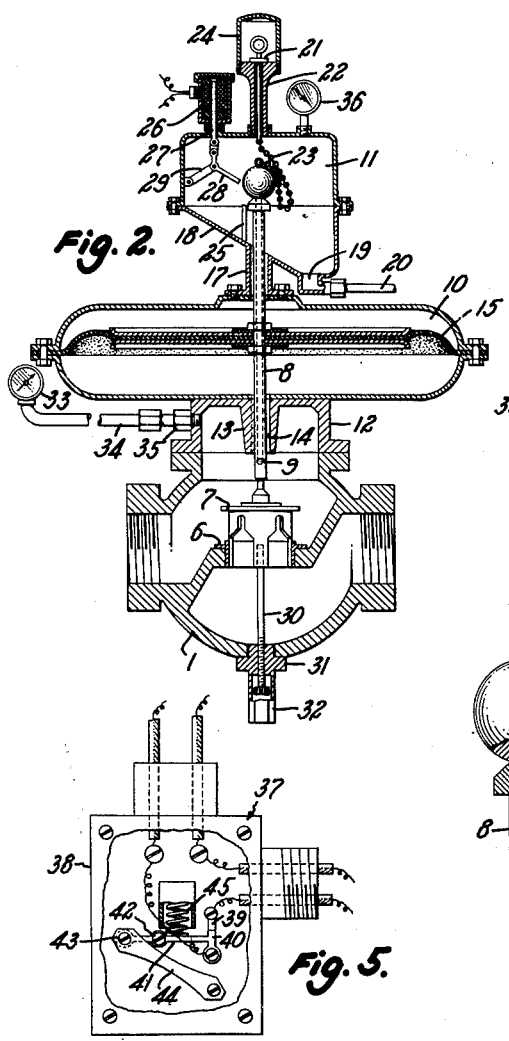
INVENTOR
Timothy J. Sullivan,
BY
Pierce, Scheffler & Parker,
ATTORNEYS.

Patented May 5, 1953

2,637,331

UNITED STATES PATENT OFFICE 2,637,331

SAFETY CUTOFF VALVE

Timothy J. Sullivan, Butte, Mont., assignor to Sullivan Valve and Engineering Company, Butte, Mont., a corporation of Montana Application April 23, 1952, Serial No. 283,891

6 Claims. (Cl. 137—39)

This invention relates to safety cut-off valves for use in pressure gas lines such as the fuel supply line to gas-fired heaters and boilers of domestic or industrial types, and more particularly to a valve which operates automatically to shut off the supply of gas to a burner upon the occurrence of any one of a number of abnormal conditions and which must be manually reset to restore operation of the burner.

An object of the invention is to provide a cut-off valve which closes automatically under certain abnormal conditions and which may be manually reset to open only after removal of all abnormal conditions which would result in an immediate reclosure of the valve. More particular objects are to provide a manually reset cut-off valve which closes automatically in the event of abnormally high or low pressure on the controlled line, of abnormal temperatures as in the case of fire, of a failure of the electrical control circuits and/or an earthquake or other severe shock which might damage the piping of the supply system; the construction being such that the valve can be reset in normal manner only after correction of the abnormal condition. Other objects are to provide a manually reset cut-off valve of the character stated which can be partially or completely opened if that is necessary to remove the abnormal condition which caused the closure of the safety valve, for example to re-light a pilot flame, or to restore service without the protection of the cut-off valve as an emergency measure.

These and other objects and the advantages of the invention will be apparent from the following specification when taken with the accompanying drawing, in which:

Fig. 1 is a fragmentary side elevation of a gas-fired furnace having a cut-off valve embodying the invention in the gas supply line in advance of the usual automatically controlled valve and regulating elements;

Figs. 2 and 3 are central vertical sections through the valve in open and closed condition, respectively;

Fig. 4 is a fragmentary view on an enlarged scale of the manually operated resetting valve element of the complete cut-off valve; and Fig. 5 is an enlarged front elevation with parts broken away to show the interior of the heat responsive control device.

In Fig. 1, the reference numeral 1 identifies the casing of the cut-off valve which is installed in the gas supply line 2 in advance of the automatically controlled valve and associated equipment of desired or conventional type which is indicated by the block 3 and legend "Controls." The gas line 4 beyond the automatic controls 3 enters the furnace 5 to feed the burners, not shown.

The valve casing 1 is divided into an inlet and an outlet chamber by a partition in which a valve seat bushing 6 is set, and the cooperating valve element 7 is of conventional inverted cup type with graduated slots in its sleeve section. The valve element 7 is carried by a hollow valve stem 8 having an inlet port 9 which opens into the inlet chamber of the valve casing; the valve stem extending upwardly through a diaphragm chamber 10 to terminate within an upper chamber 11. The diaphragm chamber is supported upon the valve casing 1 by a sleeve or inverted cup 12 having a central boss 13 with a ribbed bore 14 axially therethrough which guides the valve stem 8 for vertical movement and affords free communication between the inlet chamber of the valve casing 1 and the lower section of the diaphragm chamber 10. The valve stem 8 is secured to the diaphragm 15 and terminates at its upper end in a valve seat 16. When the cut-off valve 7 is in normal open position, a ball valve 17 rests upon the valve seat 16 of the valve stem 8 and thus breaks communication between the upper chamber 11 and the inlet side of the valve casing 1.

The upper chamber 11 is in free communication with the upper section of the diaphragm chamber 10 through the sleeve 17 which supports the upper chamber 11 on the diaphragm chamber 10 and is of substantially larger internal diameter than the valve stem 8. The lower wall 18 of the upper chamber slopes downwardly to a circular port 19 from which a vent pipe 20 extends into the fire box of the furnace 5. The ball valve 17 is manually operable by a pull rod 21 which is slidable in a sleeve 22 mounted upon the top wall of the chamber 11, the pull rod being connected to the ball valve by a flexible connector 23. A removable cap 24 is fitted over the upper end of the sleeve 22 to seal the chamber 11.

A trip rod 25 extends upwardly from the bottom wall of the chamber 11 closely adjacent the valve stem 8 to terminate below the normal upper position of the valve seat 16 of the valve stem 8 but in position to engage the ball valve 17 and displace it from valve seat 16 when the valve stem 8 is moved into lowered position by a collapse of the diaphragm 15. A solenoid 26 is mounted on the upper chamber 11 and has an armature 27 connected to a lever 28 which is pivotally mounted on the chamber 11 by a link 29; the linkage being such that a preselected condition of energization of the solenoid 26 will displace the ball valve 17 from its seat 16 and, as shown in Fig. 3, will prevent a reseating of the ball valve. As shown, the arrangement is such that the linkage is lifted to permit seating of the ball 17 on seat 16 when the solenoid 26 is energized but it is to be understood that a reverse arrangement for closure of the valve with the solenoid de-energized is possible and is contemplated by the invention.

A lifting pin 30 is preferably threaded into a bushing 31 set into the base of the valve casing 1 for lifting the valve 7 as a temporary expedient in the event of an electrical power failure or to obtain a limited flow of gas to re-light a pilot flame when the pilot is branched from the supply line or control apparatus beyond the automatic cut-off valve. The safety regulations in some localities prohibit the use of an emergency lifting pin 30 or equivalent device, and the lifting pin will normally be omitted from valves supplied to such localities. If a valve with a lifting pin is inadvertently supplied for installation where the lifting pin is banned, it can be sealed in inoperative position by pouring solder into the sleeve 32 which is integral with or secured to the bushing 31 and extends around the head of the pin to preclude inadvertent adjustment thereof in localities where it is permitted.

A pressure gauge 33 may be connected by a pipe 34 to a connector 35 which is tapped into the casting 12, and a second pressure gauge 36 may be mounted upon the chamber 11 to indicate, by reference to the gauge 33, the condition of the cut-off valve. With normal inlet pressure registered at gauge 33, a reading of substantially zero at gauge 36, as in Fig. 2, indicates that the cut-off 7 is open, since chamber 11 is then vented through the port 19. With the same indication of normal inlet pressure at both gauges, as in Fig. 3, the service man knows that the cut-off valve 7 is closed but can be re-opened if the abnormal condition which caused the valve 7 to close is no longer present. If gauge 33 indicates zero pressure, or an abnormally low or abnormally high pressure, the service man knows that the cut-off valve can not be immediately reopened.

Electric current is supplied to the solenoid 26 through the temperature responsive switch 37 which consists of the housing 38 containing the stationary contact 39 and the movable contact 40 carried on the lever 41 which is pivotally mounted at 42 and connected at 43 to the fusible link 44. The spring 45 bears against the lever 41 and tends to separate the contact 39 and 40 which normally are held together by the link 44. Upon exposure to abnormally high temperature the link 44 melts and permits the lever 41 to be moved by the spring 45 to separate the contacts 39 and 40. The link 44 must be replaced by a new one before operation of the cut-off valve can be restored.

The method of operation of the apparatus will now be described. Under normal operating conditions the several parts of the apparatus are as shown in Fig. 2, and the valve 7 is open as the inlet gas pressure is applied to the lower face of diaphragm 15 through the bore 14, and the pressure above the diaphragm is atmospheric or less due to the venting of the chamber 11 through the port 19. If the gas pressure drops below some preselected value, the diaphragm 15 will drop by gravity and will move the valve stem 8 downwardly to close the valve 7 and to displace the ball valve 17 from its seat 16 by engagement with the trip member 25. The ball valve 17 will then roll down to seat on the vent port 19 and close the same. The cut-off valve may be closed by other abnormal conditions, for example by excessive gas pressure, by a heavy shock which displaces the ball valve from its seat or by failure of the electrical control system which shifts the lever 28 to force the ball valve from its seat.

The valve 7 can be reset to open position only be removing the cap 24 and lifting the pull rod 21 to reseat the ball valve 17 upon the valve seat 16 at the upper end of the valve stem 8, and this reseating is possible only when the abnormal conditions which caused the closure of valve 7 no longer exists. Assuming normal gas pressure at the inlet side of the valve casing 1, as indicated in Fig. 3 by the pressure indications of gauges 33 and 36, the diaphragm 15 will rise when the ball valve 17 is lifted from the vent port 19 of the chamber 11, since the vent port is of relatively large diameter with respect to the inlet opening 9 of the hollow valve stem 8. The cut-off valve is thus opened by the lifting of the diaphragm 15, and the valve seat 16 of the valve stem 8 is elevated into position to receive the ball valve 17. If all operating conditions are correct, the ball valve can be lowered into position upon the valve seat 16, thus blocking the flow of pressure gas into the chamber 11, and the cut-off valve 7 will be held in open position by the gas pressure upon the lower face of the diaphragm 15. In case of a failure of the electrical power or of a defect in the electrical control circuits, as is indicated in Fig. 3, the lever 28 extends at least partially over the valve stem 8 and blocks the seating of the ball valve 17 upon its seat 16. The fact that the defect is in the electrical system is immediately apparent since the pressure reading of gauge 36 will indicate a normal supply of gas.

While the invention has been described with reference to the supply of gas to a burner, it is to be understood that the safety cut-off valve may be employed with advantage in pressure gas lines supplying components to chemical reaction chambers. Some type of automatic alarm will usually be provided in such applications of the invention as the failure to introduce the pressure gas will result in defective operation and possibly will give rise to a dangerous condition.

The invention is not limited to the particular embodiment herein illustrated and described as various changes which may be made in the design and arrangement of the several parts fall within the spirit and scope of the invention as set forth in the following claims.

I claim:

1. A safety cut-off valve for use in a pressure gas line comprising a valve casing divided into an inlet chamber and an outlet chamber by a partition provided with a valve seat, a valve element cooperating with said valve seat, a hollow valve stem carrying said valve element and having a port affording communication between its bore and the inlet chamber of the valve casing, a diaphragm chamber above said valve casing and an upper chamber above said diaphragm chamber, a flexible diaphragm extending across said diaphragm chamber and secured to said valve stem to actuate the same, the lower and the upper sections of said diaphragm chamber being in communication with the inlet chamber of the valve casing and the upper chamber respectively, said hollow valve stem extending upwardly to terminate in a valve seat within said upper chamber, a vent port in the bottom wall of said upper chamber and of greater gas-carrying capacity than said hollow valve stem, a ball valve adapted to seat upon the valve seat at the upper end of said valve stem or alternatively upon said vent port, thereby to vent pressure gas from the upper chamber and the upper section of the diaphragm casing or alternatively to equalize the gas pressures in the sections of the diaphragm casing, and a manually operable flexible connection to said ball valve for lifting the same from said vent port and into position above said valve stem seat, said ball valve being displaceable by abnormal shock from its seat on the hollow valve stem.

2. A safety cut-off valve as recited in claim 1, in combination with stationary trip means in said upper chamber for displacing said ball valve from its seat upon a preselected lowering of said valve stem due to reduced pressure within said inlet chamber of the valve casing.

3. A safety cut-off valve as recited in claim 1, in combination with electromagnetic means for displacing said ball valve from its seat on said hollow valve stem upon a preselected condition of energization thereof.

4. A safety cut-off valve as recited in claim 1, in combination with a pressure gauge secured to the upper chamber to indicate the gas pressure therein.

5. A safety cut-off valve as recited in claim 1, in combination with a lifting pin threaded into the valve casing and manually adjustable to lift the valve element from its seat against the closing force exerted upon said hollow valve stem by said diaphragm.

6. A safety cut-off valve as recited in claim 1, in combination with electromagnetic means for displacing said ball valve from its seat on said hollow valve stem upon failure of the supply of electric current to said electromagnetic means and means in the electric circuit responsive to abnormally high temperature for breaking said circuit.

TIMOTHY J. SULLIVAN.

References Cited in the file of this patent

UNITED STATES PATENTS

| Number | Name | Date |
|---|---|---|
| 89,568 | Runnion et al. | June 23, 1908 |
| 1,055,803 | Runnion | Mar. 11, 1913 |
| 1,405,950 | Stafford | Feb. 7, 1922 |
| 1,609,930 | Cohen | Dec. 7, 1926 |
| 1,742,685 | Branchon | Jan. 7, 1930 |
| 2,228,701 | Hanson | Jan. 14, 1941 |
| 2,229,543 | Bailey | Jan. 21, 1941 |

FOREIGN PATENTS

| Number | Country | Date |
|---|---|---|
| 104,102 | Australia | May 27, 1938 |